United States Patent
Balachandran et al.

(10) Patent No.: US 10,817,515 B2
(45) Date of Patent: Oct. 27, 2020

(54) COGNITIVE DATA FILTERING FOR STORAGE ENVIRONMENTS

(71) Applicant: International Business Machines Corporation, Armonk, NY (US)

(72) Inventors: Subashini Balachandran, Sunnyvale, CA (US); Rui Zhang, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 15/660,733

(22) Filed: Jul. 26, 2017

(65) Prior Publication Data

US 2019/0034487 A1  Jan. 31, 2019

(51) Int. Cl.
  *G06F 16/30* (2019.01)
  *G06F 16/2453* (2019.01)
  *G06F 16/335* (2019.01)
  *G06N 5/02* (2006.01)

(52) U.S. Cl.
  CPC ...... *G06F 16/24549* (2019.01); *G06F 16/335* (2019.01); *G06N 5/02* (2013.01)

(58) Field of Classification Search
  CPC .................................................. G06F 16/335
  See application file for complete search history.

(56) References Cited

U.S. PATENT DOCUMENTS

| | | | |
|---|---|---|---|
| 5,537,591 A | 7/1996 | Oka | |
| 6,675,159 B1* | 1/2004 | Lin | G06F 17/2705 |
| 7,437,686 B1 | 10/2008 | Bernstein et al. | |
| 7,590,747 B2 | 9/2009 | Coates et al. | |
| 8,099,401 B1 | 1/2012 | Hsu et al. | |
| 8,171,125 B2 | 5/2012 | Gopalakrishnan | |
| 8,661,449 B2 | 2/2014 | Rossbach et al. | |
| 8,862,580 B1* | 10/2014 | Emigh | G06F 16/353 |
| | | | 707/731 |

(Continued)

FOREIGN PATENT DOCUMENTS

| | | |
|---|---|---|
| CN | 104484404 A | 4/2015 |
| CN | 104767813 A | 7/2015 |

(Continued)

OTHER PUBLICATIONS

Article entitled "The Truth of the F-measure", dated Oct. 26, 2007, by Sasaki.*

(Continued)

*Primary Examiner* — Mahesh H Dwivedi
(74) *Attorney, Agent, or Firm* — Zilka-Kotab, P.C.

(57) ABSTRACT

In one embodiment, a method for cognitively filtering data in a storage environment includes generating a plurality of cognitive data filters based on one or more factors to create a plurality of groups. The method also includes cognitively filtering data received by a global data repository to place independent portions of the data into the plurality of groups using the plurality of cognitive data filters prior to receiving a query on the global data repository. Data within each of the plurality of groups share a common definable characteristic. Other systems, methods, and computer program products for cognitively filtering data within storage environments are presented in accordance with more embodiments.

25 Claims, 10 Drawing Sheets

(56) References Cited

U.S. PATENT DOCUMENTS

| | | | |
|---|---|---|---|
| 9,405,811 | B2 | 8/2016 | Eshleman et al. |
| 9,774,993 | B1* | 9/2017 | DeLuca ............... G06F 16/29 |
| 2007/0273696 | A1* | 11/2007 | Cheng ............... G06K 9/00771 |
| | | | 345/467 |
| 2009/0094416 | A1 | 4/2009 | Baeza-Yates et al. |
| 2012/0060195 | A1* | 3/2012 | Fishman ............ H04N 21/252 |
| | | | 725/58 |
| 2013/0055127 | A1 | 2/2013 | Saito et al. |
| 2013/0232189 | A1* | 9/2013 | Lewis ................ G06Q 30/06 |
| | | | 709/203 |
| 2014/0149102 | A1* | 5/2014 | Marcu ............... G06F 17/2827 |
| | | | 704/2 |
| 2014/0283140 | A1* | 9/2014 | Gorman .............. G06F 21/62 |
| | | | 726/30 |
| 2014/0365241 | A1 | 12/2014 | Dillie et al. |
| 2015/0120763 | A1* | 4/2015 | Grue .................. G06F 16/24 |
| | | | 707/754 |
| 2015/0324423 | A1 | 11/2015 | Wang et al. |
| 2015/0324454 | A1 | 11/2015 | Roberts et al. |
| 2016/0011816 | A1 | 1/2016 | Aizman |
| 2016/0041640 | A1* | 2/2016 | Beaumier .......... H04N 21/8113 |
| | | | 345/173 |
| 2016/0275094 | A1 | 9/2016 | Lipcon |
| 2017/0200125 | A1 | 7/2017 | Wang et al. |
| 2019/0034445 | A1 | 1/2019 | Balachandran et al. |

FOREIGN PATENT DOCUMENTS

| | | | |
|---|---|---|---|
| CN | 104866497 | A | 8/2015 |
| CN | 105550180 | A | 5/2016 |
| CN | 106056427 | A | 10/2016 |
| CN | 106527993 | A | 3/2017 |
| EP | 865180 | A2 | 9/1998 |
| WO | 9948003 | A2 | 9/1999 |

OTHER PUBLICATIONS

Article entitled "On extending F-measure and G-mean metrics to multi-class problems", Copyright 2005, by Espindola.*
Article entitled "Unstructured text to spreadsheet conversion with IBM's Bluemix and R", by Hove, dated Jun. 19, 2016.*
Article entitled "Getting Robots to Listen: Using Watson's Speech to Text Service", by Reese-Jones, dated Jul. 19, 2016.*
Article entitled "How Spotify's Discover Weekly playlist knows exactly what you want to hear", by Heath, dated Sep. 5, 2015.*
Hung et al., "Scheduling Jobs Across Geo-distributed Datacenters," VLDB Endowment, vol. 9, No. 2, 2015, pp. 1-14.
Vulimiri, "Global Analytics in the Face of Bandwidth and Regulatory Constraints," 12th USENIX Symposium on Networked Systems Design and Implementation (NSDI '15), 2015, pp. 322-336.
Vulimiri, "WANalytic.s: Analytics for a Geo-Distributed Data-Intensive World," 7th Biennial Conference on Innovative Data Systems Research (CIDR '15), 2015, pp. 1-9.
Kloudas et al., "Pixida: Optimizing Data Parallel Jobs in Wide-Area Data Analytics," VLDB Endowment, vol. 9, No. 2, 2015, pp. 72-83.
Balachandran et al., U.S. Appl. No. 15/660,715, filed Jul. 26, 2017.
List of IBM Patents or Patent Applications Treated as Related.
International Search Report and Written Opinion from PCT Application No. PCT/IB2018/055295, dated Dec. 12, 2018.
International Search Report and Written Opinion from PCT Application No. PCT/IB2018/055296, dated Nov. 21, 2018.
Non-Final Office Action from U.S. Appl. No. 15/660,715, dated Aug. 1, 2019.
Final Office Action from U.S. Appl. No. 15/660,715, dated Jan. 31, 2020.
Advisory Action from U.S. Appl. No. 15/660,715, dated Apr. 8, 2020.
Non-Final Office Action from U.S. Appl. No. 15/660,715, dated May 11, 2020.
Notice of Allowance from U.S. Appl. No. 15/660,715, dated Sep. 3, 2020.

* cited by examiner

COGNITIVE DATA FILTERING FOR STORAGE ENVIRONMENTS

BACKGROUND

The present invention relates to data filtering, and more particularly, to cognitive data filtering for storage environments.

Large file systems that store massive amounts of data, such as central distributed clustered file systems, are able to provide access to all files and/or objects stored within the file systems to all authorized users. When a user wants to access data on the file system, typically a query is sent to a controller or storage manager, and a determination is made as to which data is appropriate to respond to such a query from a global data repository. However, this task of scanning or searching the massive amounts of data that is stored to the global data repository is resource intensive and causes delays in responding to such queries, along with adding latency to use of the file system for other queries and operations.

Moreover, big data analytics may require scanning very large portions (or all) of the data stored to the global data repository. It may be too resource intensive to execute all queries directly on the global data repository, and therefore queries may be executed on a device other than the controller that has access to the global data repository by copying over all the data from the global data repository to the other device. In some instances, after running the analytics operation(s), the copied-over data is deleted from the other device, which then requires copying over all the data from the global data repository again for execution of a subsequent analytics operation. In other instances, the copied-over data may be cached, which requires an enormous amount of local storage on the other device. In either instance, the copied-over data includes all of the data in the global data repository, as there is no intelligence that determines what data is to be used in the analytics operation and what may remain uncopied on the global data repository. Moreover, not all of the copied-over data may be used in the analytics operation and is just dropped in processing the query, thus wasting considerable resources, such as network bandwidth, processing bandwidth, memory capacity, time, etc.

Alternatively, when there is sufficient processing capacity in the global data repository to process all queries, the data may still be cached (i.e., copied over and preserved in local memory to the global data repository) in order to speed up query processing. Similar resource costs apply when executing the queries in this fashion as when copying over the data to execute the queries on the other device.

SUMMARY

In one embodiment, a method includes generating a plurality of cognitive data filters based on one or more factors to create a plurality of groups and cognitively filtering data received by a global data repository to place independent portions of the data into the plurality of groups using the plurality of cognitive data filters prior to receiving a query on the global data repository. Data within each of the plurality of groups share a common definable characteristic.

In another embodiment, a computer program product includes a computer readable storage medium having program instructions embodied therewith. The computer readable storage medium is not a transitory signal per se. Also, the embodied program instructions are executable by a processing circuit to cause the processing circuit to generate, by the processing circuit, a plurality of cognitive data filters based on one or more factors to create a plurality of groups. In addition, the embodied program instructions are executable by the processing circuit to cause the processing circuit to cognitively filter, by the processing circuit, data received by a global data repository to place independent portions of the data into the plurality of groups using the plurality of cognitive data filters prior to receiving a query on the global data repository. Data within each of the plurality of groups share a common definable characteristic.

In another embodiment, a system includes a processing circuit, a memory, and logic stored to the memory, that when executed by the processing circuit causes the processing circuit to generate a plurality of cognitive data filters based on one or more factors to create a plurality of groups. Moreover, the logic causes the processing circuit to cognitively filter data received by a global data repository to place independent portions of the data into the plurality of groups using the plurality of cognitive data filters prior to receiving a query on the global data repository. Data within each of the plurality of groups share a common definable characteristic.

In yet another embodiment, a method includes receiving data at a global data repository from one or more sources. The data includes text and unstructured data. The method also includes storing the data to the global data repository and converting the unstructured data into text-based data. In addition, the method includes storing the text-based data on the global data repository and generating a plurality of cognitive data filters based on one or more factors to create a plurality of group. The factors include one or more keywords. Also, the method includes cognitively filtering the data to place independent portions of the data into the plurality of groups using the plurality of cognitive data filters prior to receiving a query on the global data repository. Data within each of the plurality of groups share a common definable characteristic, and the plurality of cognitive data filters are applied to the text-based data after being converted from the unstructured data. Moreover, the method includes receiving an indication of the query and determining and pre-fetching at least one group from the plurality of groups that corresponds with the query. Furthermore, the method includes responding to the query by duplicating data within the at least one group to a requesting device that provided the indication of the query and receiving an indication of usage of data within the at least one group provided to the requesting device with respect to the query. Moreover, the method includes adapting the plurality of cognitive data filters over time to improve an effectiveness of the plurality of cognitive data filters as measured against the usage of the data within the at least one group provided to the requesting device. The effectiveness of the plurality of cognitive data filters is based on each of: a portion of the data within the at least one group provided to the requesting device that is actually utilized by the query, and a percentage out of all data stored to the requesting device that is available to be used in the query that is provided within the at least one group.

Other aspects and embodiments of the present invention will become apparent from the following detailed description, which, when taken in conjunction with the drawings, illustrate by way of example the principles of the invention.

DETAILED DESCRIPTION

Figure 1:
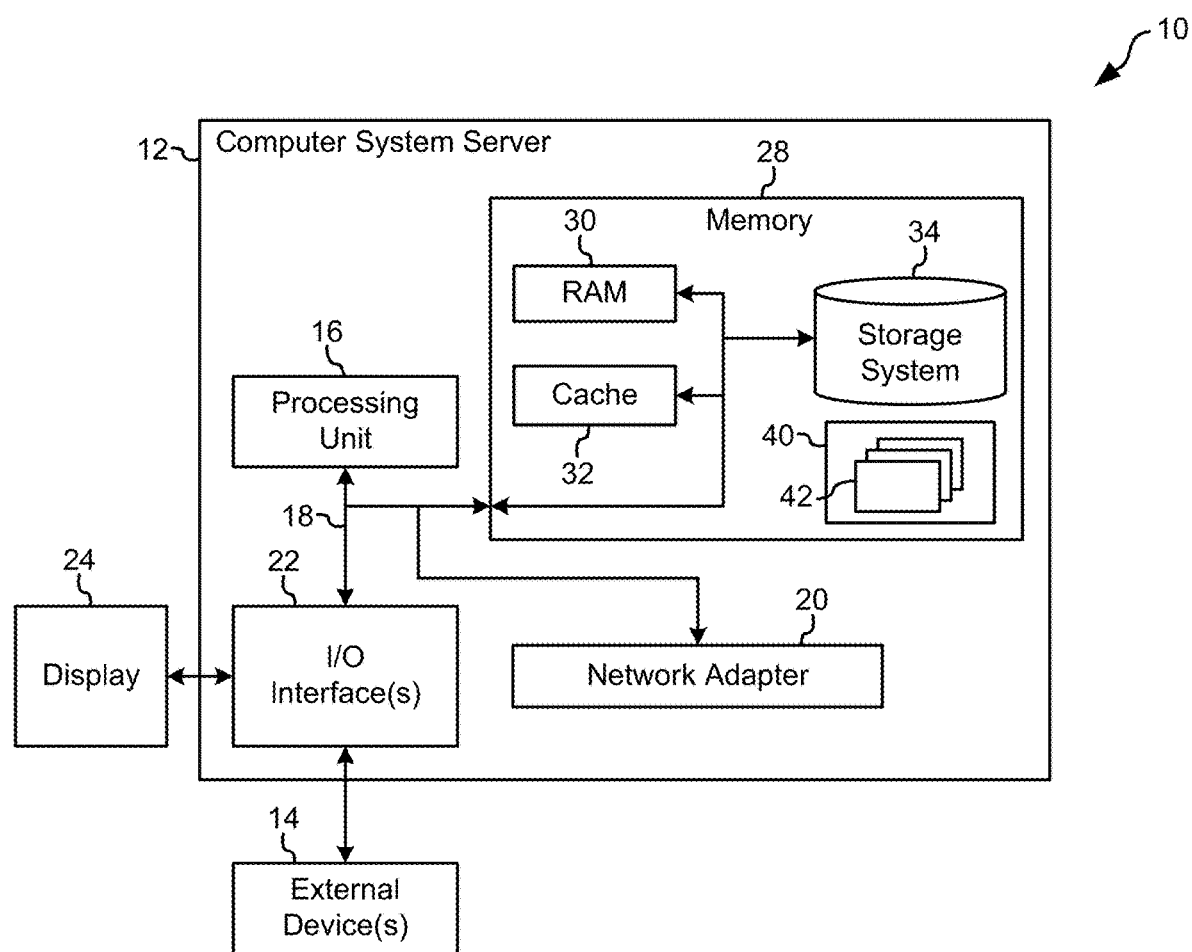
FIG. 1 depicts a cloud computing node according to an embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "about" as used herein indicates the value preceded by the term "about," along with any values reasonably close to the value preceded by the term "about," as would be understood by one of skill in the art. When not indicated otherwise, the term "about" denotes the value preceded by the term "about"±10% of the value. For example, "about 10" indicates all values from and including 9.0 to 11.0.

The following description discloses several preferred embodiments of systems, methods, and computer program products for cognitive filtering of files and objects in a storage environment.

In one general embodiment, a method includes generating a plurality of cognitive data filters based on one or more factors to create a plurality of groups and cognitively filtering data received by a global data repository to place independent portions of the data into the plurality of groups using the plurality of cognitive data filters prior to receiving a query on the global data repository. Data within each of the plurality of groups share a common definable characteristic.

In another general embodiment, a computer program product includes a computer readable storage medium having program instructions embodied therewith. The computer readable storage medium is not a transitory signal per se. Also, the embodied program instructions are executable by a processing circuit to cause the processing circuit to generate, by the processing circuit, a plurality of cognitive data filters based on one or more factors to create a plurality of groups. In addition, the embodied program instructions are executable by the processing circuit to cause the processing circuit to cognitively filter, by the processing circuit, data received by a global data repository to place independent portions of the data into the plurality of groups using the plurality of cognitive data filters prior to receiving a query on the global data repository. Data within each of the plurality of groups share a common definable characteristic.

In another general embodiment, a system includes a processing circuit, a memory, and logic stored to the memory, that when executed by the processing circuit causes the processing circuit to generate a plurality of cognitive data filters based on one or more factors to create a plurality of groups. Moreover, the logic causes the processing circuit to cognitively filter data received by a global data repository to place independent portions of the data into the plurality of groups using the plurality of cognitive data filters prior to receiving a query on the global data repository. Data within each of the plurality of groups share a common definable characteristic.

In yet another general embodiment, a method includes receiving data at a global data repository from one or more sources. The data includes text and unstructured data. The method also includes storing the data to the global data repository and converting the unstructured data into text-based data. In addition, the method includes storing the text-based data on the global data repository and generating a plurality of cognitive data filters based on one or more factors to create a plurality of group. The factors include one or more keywords. Also, the method includes cognitively filtering the data to place independent portions of the data into the plurality of groups using the plurality of cognitive data filters prior to receiving a query on the global data repository. Data within each of the plurality of groups share a common definable characteristic, and the plurality of cognitive data filters are applied to the text-based data after being converted from the unstructured data. Moreover, the method includes receiving an indication of the query and determining and pre-fetching at least one group from the plurality of groups that corresponds with the query. Furthermore, the method includes responding to the query by duplicating data within the at least one group to a requesting device that provided the indication of the query and receiving an indication of usage of data within the at least one group provided to the requesting device with respect to the query. Moreover, the method includes adapting the plurality of cognitive data filters over time to improve an effectiveness of the plurality of cognitive data filters as measured against the usage of the data within the at least one group provided to the requesting device. The effectiveness of the plurality of cognitive data filters is based on each of: a portion of the data within the at least one group provided to the requesting device that is actually utilized by the query, and a percentage out of all data stored to the requesting device that is available to be used in the query that is provided within the at least one group.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
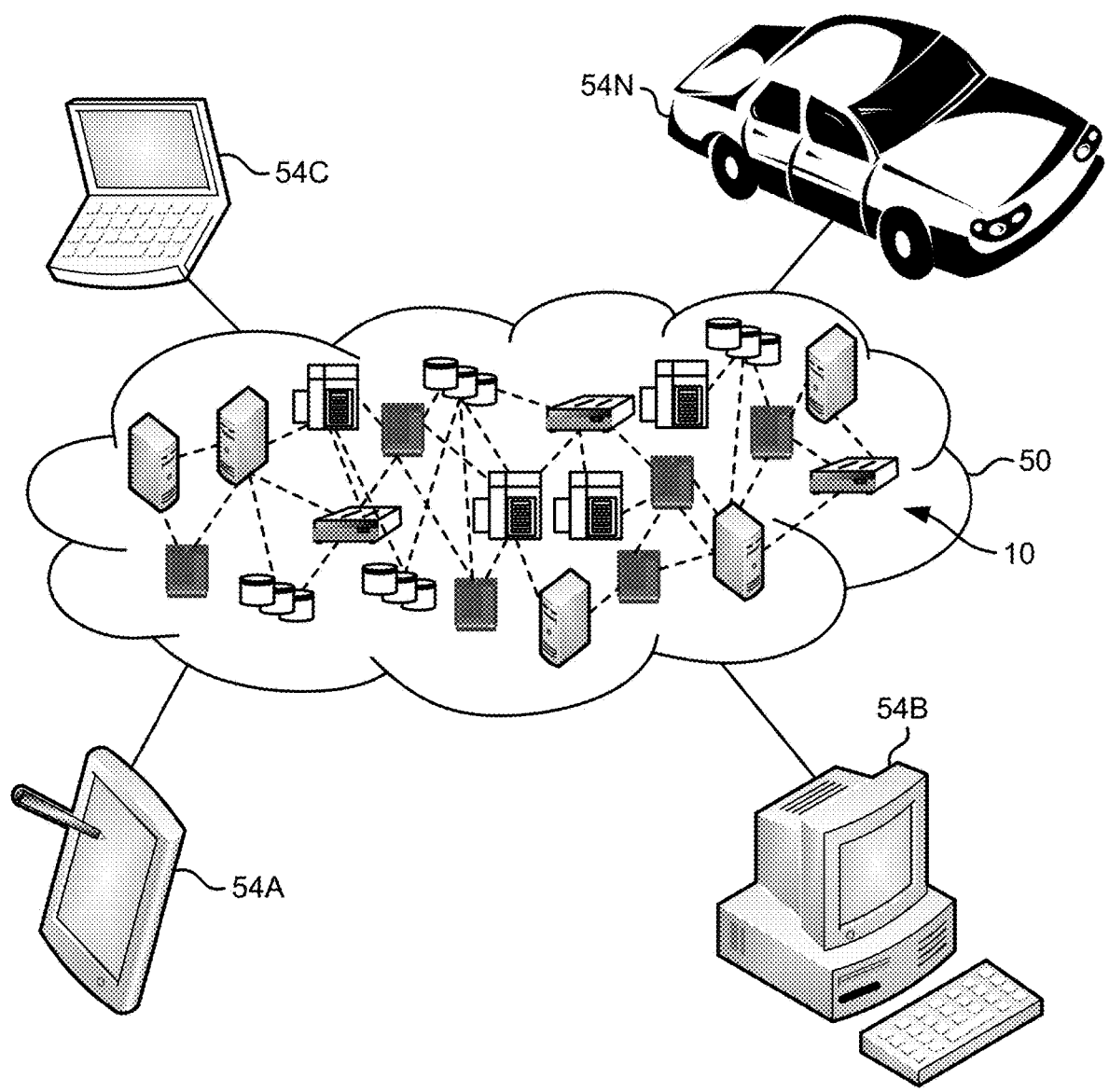
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
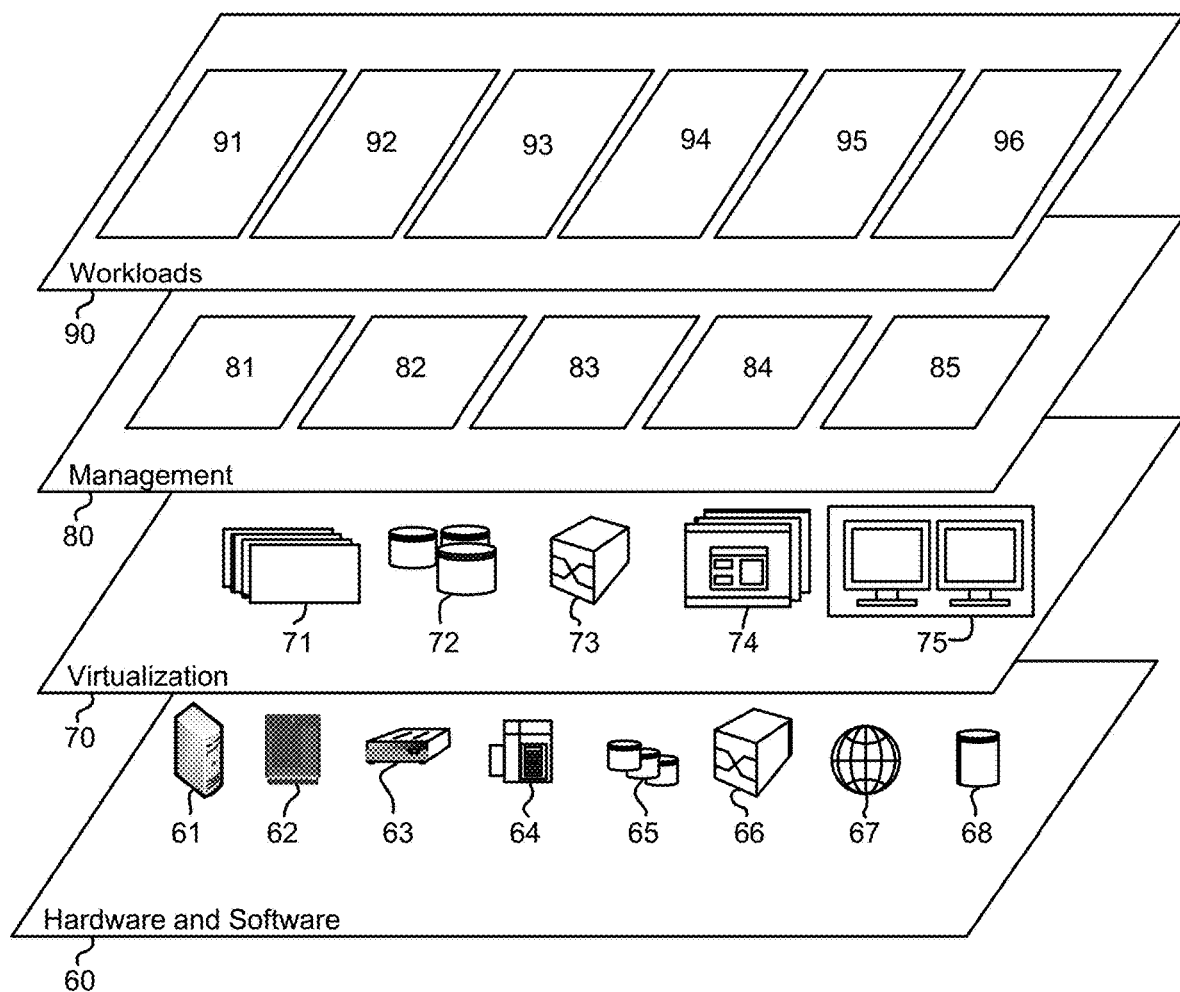
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive file/object filtering for storage environments 96.

Figure 4:
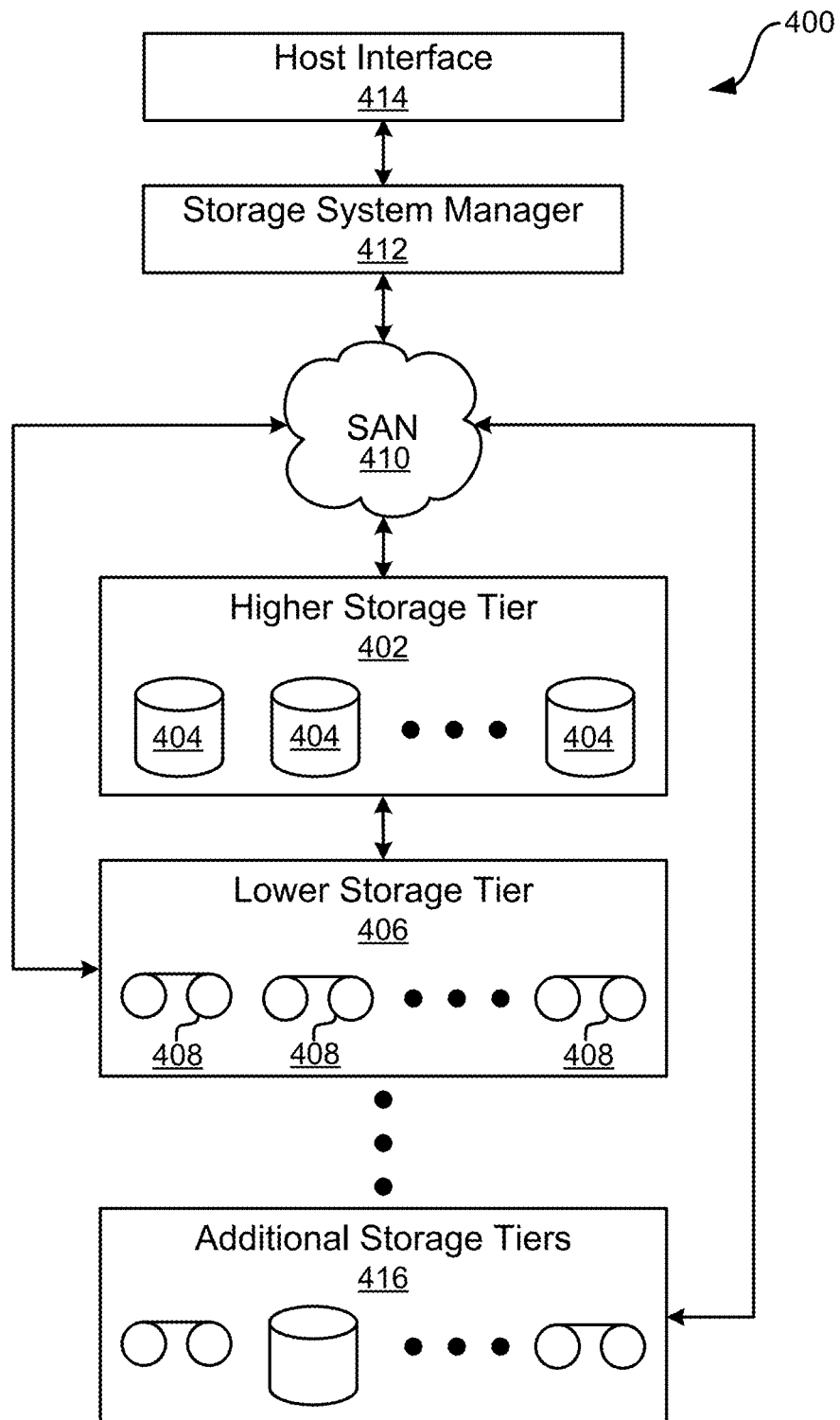
FIG. 4 illustrates a tiered data storage system in accordance with one embodiment.

Now referring to FIG. 4, a tiered storage system 400 is shown according to one embodiment, which may be representative of a public tiered object store in some approaches. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as nonvolatile memory (NVM), solid state memory in solid state drives (SSDs), flash memory, SSD arrays, flash memory arrays, hard disks in hard disk drives (HDDs), etc., and/or others noted herein or known in the art. The lower storage tier(s) 406 may preferably include one or more lower performing storage media 408, including slower accessing HDDs, sequential access media such as magnetic tape in tape drives and/or optical media, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media (up to and including all SSD storage media) for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

In one particular embodiment, the storage system 400 may include a combination of SSDs and HDDs, with the higher storage tier 402 including SSDs (and possibly some buffer memory) and the lower storage tier 406 including HDDs (and possibly some buffer memory). According to another embodiment, the storage system 400 may include a combination of SSDs and magnetic tape with magnetic tape drives, with the higher storage tier 402 including SSDs (and possibly some buffer memory) and the lower storage tier 406 including magnetic tape (and possibly some buffer memory) and magnetic tape drives for accessing data from the magnetic tapes. In yet another embodiment, the storage system 400 may include a combination of HDDs and magnetic tape, with the higher storage tier 402 including HDDs (and possibly some buffer memory) and the lower storage tier 406 including magnetic tape (and possibly some buffer memory).

Figure 5A:
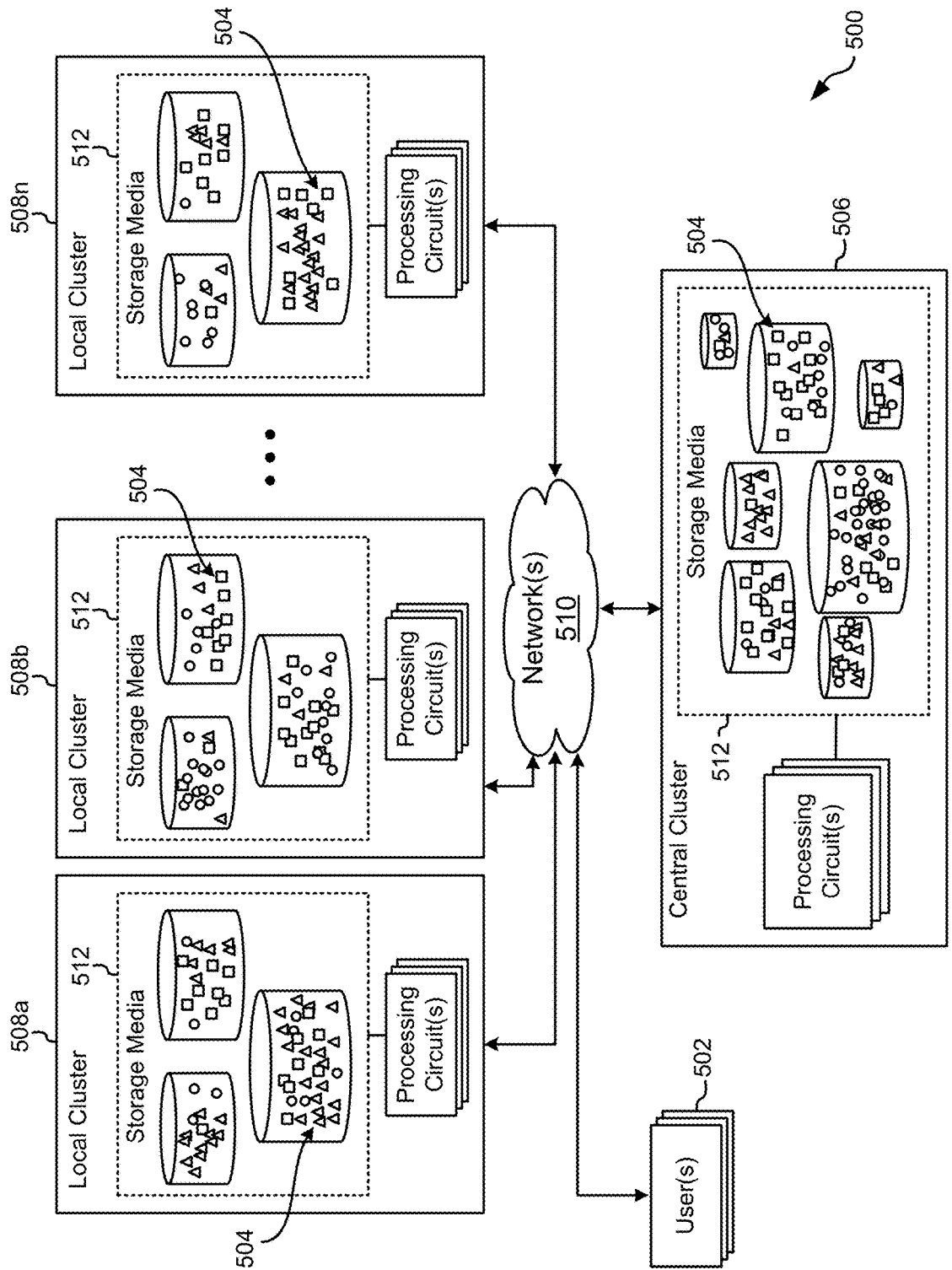
FIGS. 5A-5C show a distributed system during several stages of filtering and grouping data for efficient query handling, according to one embodiment.

Now referring to FIG. 5A, a block diagram of a central, distributed, and clustered file system 500 (hereafter "distributed system 500") is shown according to one embodiment. This distributed system 500 may be used in any of the cognitive filtering methods described herein, in accordance with various embodiments. The distributed system 500 may include any number of files and/or objects (hereafter "files 504") that store and/or include information and/or data, and are accessible to one of more users 502 of the distributed system 500. Moreover, the distributed system 500 includes a central cluster 506 that is configured as a global data repository, a plurality of local cache clusters 508a, 508b, . . . , 508n (hereafter "local clusters 508" when referred to as a group) that are geographically diverse from the central cluster, and one or more networks 510 that couple the various local clusters 508 with the central cluster 506. Any type of network(s) 510 may be used, as would be apparent to one of skill in the art upon reading the present descriptions, such as, but not limited to, the Internet, a WAN, a LAN, a SAN, etc.

In addition, the central cluster 506 and each of the local clusters 508 include a hardware processing circuit configured to execute program instructions provided thereto. Other hardware and/or software components not specifically described herein may also be included in the central cluster 506 and/or one or more of the local clusters 508 as would be known to one of skill in the art.

In one embodiment, one or more of the hardware components within the central cluster 506 and/or one or more of the local clusters 508 may have redundant components installed in parallel in order to perform redundant functionality in cases where a primary hardware component fails, loses power, etc., and is unavailable to perform its assigned task(s).

In addition, the central cluster 506 and each of the local clusters 508 include one or more types of computer readable storage media 512. Any type of computer readable storage media 512 may be utilized in the central cluster 506 and the various local clusters 508, such as but not limited to, non-volatile memory (NVM) storage devices, direct access storage devices (DASDs), random access memory units, etc. Any suitable NVM storage device(s) may be utilized, such as Flash memory, RAM, erasable programmable read-only memory (EPROM), solid state devices (SSDs), etc. Moreover, any DASDs may be used, such as HDDs, tape media for use with a tape drive, optical drives, etc. Additionally, a cache or buffer may also be present in the computer readable storage media 512 for data staging prior to storage on the computer readable storage media 512.

The files 504 stored to the central cluster 506 and files stored to the local clusters 508 may include information that varies in type (text data, video data, audio data, unstructured data, etc.), size, substance or content, etc., as would be understood by one of skill in the art. Moreover, metadata associated with the files 504 may indicate at least some of the characteristics of the various files 504 in some approaches. However, the files 504 stored to the central cluster 506 are not organized in any meaningful way that provides for efficient searching and/or filtering thereof, in conventional approaches.

Figure 5B:
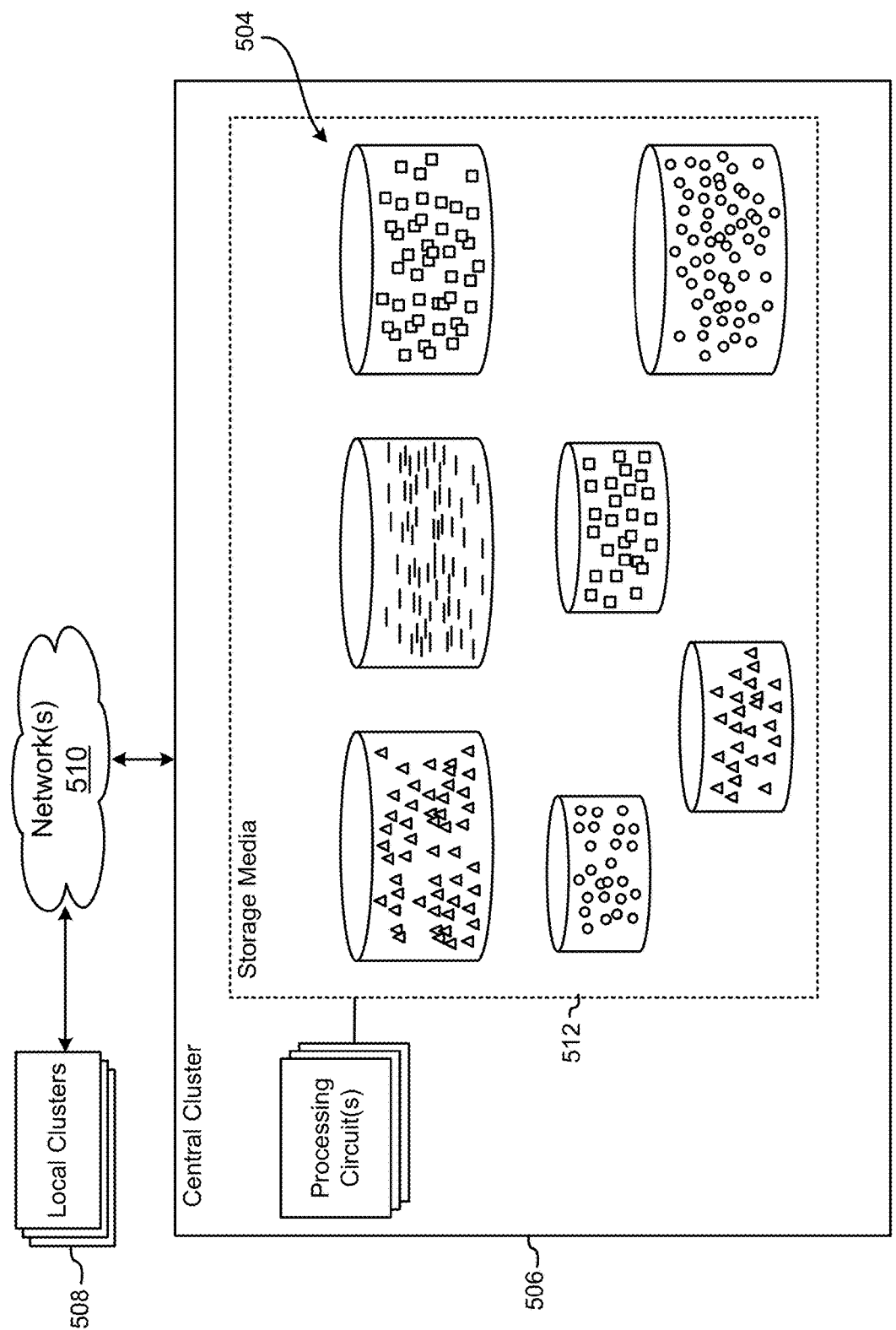

Now referring to FIG. 5B, a process is described that provides for cognitive filtering of the files 504 into sub-containers on the central cluster 506 according to one embodiment. This process improves and enhances the ability to search and/or filter the files 504 stored to the central cluster 506 to determine files more likely to be relevant to a query, in various approaches.

Any known search algorithm may be used, such as but not limited to the Rabin-Karp string search algorithm, finite-state automaton-based search algorithm, Knuth-Morris-Pratt algorithm, etc., along with proprietary algorithms provided by major technology companies, such as Google®, Microsoft®, Baidu®, Tencent®, etc.

In order to organize the files 504 on the central cluster 506, all unstructured data stored in the files 504 is converted into text in text-based or text-annotated files (in the case of images and/or video files, text annotations may be added to the original files as metadata), which are readily and efficiently searchable using any of a plurality of conventional search algorithms. For the remainder of these descriptions, pure text files and mixed content text-annotated files will be referred to as text-based files. Once an original file from the files 504 is converted into a text-based file, an association is made between the original file and the produced text-based file so that any search that returns the text-based file is able to be traced back to the original file.

In one embodiment, one or more application program interfaces (APIs) may be used to convert the unstructured data into text-based data. Each type of unstructured data may have a different API applied thereto in order to convert the unstructured data into text-based data. In one embodiment, IBM® BlueMix® Watson APIs may be used for the conversion to text-based data.

According to one embodiment, all files 504 stored on the central cluster 506 may be searched using one or more search algorithms that are designed to search particular content or particular unstructured data within the files 504. In one example, an image search algorithm may be configured to specifically search image files and return image(s) that are specified in the search such that each of the files which include image data may be searched using this search algorithm, and those files which include the specified image(s) will be returned by the image search. In a further example, files which do not include image data will not have this image search algorithm applied thereto.

In another example, an audio search algorithm may be configured to specifically search audio files and return audio data that is specified in the search such that each of the files which include audio data may be searched using this search algorithm, and those files which include the specified audio data will be returned by the audio search. In a further example, files which do not include audio data will not have this audio search algorithm applied thereto.

Of course, many other content-specific and/or unstructured data search algorithms, including those designed to search custom and/or proprietary unstructured data forms, may be used in searching and organizing the files 504 stored on the central cluster 506 in various additional embodiments, as would be apparent to one of skill in the art upon reading the present descriptions.

The text-based files and/or all files 504 stored on the central cluster 506 are analyzed to determine one or more relevant categories for each of the text-based files and/or all files 504 stored on the central cluster 506 so that filtering and grouping may be performed on the various files 504 (and ultimately the associated files). The relevancy of the categories is selected based on interests of a particular user, e.g., a type of business the user is engaged in, a geographic location (e.g., of the user, a home, a place of business, etc.), a date of the query, etc. Moreover, the categories in which grouping is made may be exclusive (e.g., a file may only exist in one group at any one time) or may be inclusive (e.g., a file may exist in more than one group at any one time, providing for overlap of content between different groups).

Data filtering on the central cluster 506 is a key building block that allows for many advanced storage functions (e.g., caching, access control, security, searching, etc.). These advanced functions may relate to and draw from many aspects of data storage, including but not limited to data storage performance and data security. Data filters that are used for such data filtering should not remain stagnant, and are better when they can be modified and learn over time to adjust for changes to the storage environment, changes the data stored to the global data repository, changes to access patterns and demand of users, and other unforeseen changes. Moreover, the data filters may also be adjusted to account for changes to storage policies enacted by an administrator of the storage environment.

In various non-limiting examples, the text-based files and/or all files 504 stored on the central cluster 506 may be filtered and grouped according to a date associated with the individual files (e.g., a value), a geographical location mentioned in and/or associated with the individual files (e.g., a keyword), a geographical location of creation of the individual files (e.g., a keyword), similar and/or common content of the individual files (which may be based on keyword(s) within the individual files), similar usage of the individual files (e.g., a contextual metadata search returning last accessed date for files), a frequency of access to the individual files (e.g., a contextual metadata search returning a frequency of access for files), etc.

In another non-limiting example, the text-based files and/or all files 504 stored on the central cluster 506 may be filtered and grouped according to a value, multiple values, and/or a range of values that are stored within the individual files, with the values relating to a specified parameter in the query, such as date, currency, time, virtual or physical location, user group(s), access privilege, or some other specified value of interest to the creator of the query. The specified value of interest may be anything that is of importance related to a business, education, pursuit, and/or interest for which data is stored in the distributed storage system. In several examples, for a medical industry application, a specified value of interest may be one or more patient categorizations (e.g., age, gender, race, existing conditions, etc.), one or more condition categorizations (e.g., cancer, asthma, strep throat, arthritis, etc.), one or more test categorizations (e.g., radiological testing, genetic testing, physical examination etc.), etc.; for a financial industry application, a specified value of interest may be one or more ticker symbols (e.g., MSFT, INTL, T, etc.), one or more industry categorizations (e.g., technology, software, pharmaceutical, manufacturing, etc.), one or more valuation metrics (e.g., over 1 billion capitalization, small-, mid-, large-cap, etc.), etc.; for a pharmacological industry application, a specified value of interest may be one or more drug-based categorizations statin, caffeine, benzodiazepine, fentanyl, acetaminophen, morphine, opiate, oxycodone, etc.), one or more scientists associated with a treatment, one or more treatment applications (pain-reliever, swelling reducer, local anesthetic, etc.), one or more dosages, etc.

As one of skill in the art would appreciate upon reading the present descriptions, a specific value of interests) may be custom defined based on a particular application and the specific queries that will utilize the specific value(s) of interest, in various embodiments.

In yet another non-limiting example, the text-based files and/or all files 504 stored on the central cluster 506 may be filtered and grouped according to a popularity of the information included in the individual files as measured by the central cluster 506 and how often any particular file is duplicated onto one of the local clusters 508.

According to another embodiment, sub-groups may be created within a group, and multiple additional levels of sub-groups may exist within a particular group in a tree structure. In this way, files that are sorted into the particular group may be further sorted into sub-groups that are even more refined than the particular group. For example, when grouping by location, country may populate the top groups, followed by sub-groups for states or provinces, then by sub-groups for cities, followed by sub-groups for communities within cities, etc.

In one embodiment, this filtering and grouping operation may be executed as a continuous background process executed on the central cluster 506, such that as new files are added to the central cluster 506, they are able to be converted (if necessary) and categorized efficiently and with little effect on other functionality of the distributed system 500. In another embodiment, the filtering and grouping operation may be executed periodically or in response to a triggering event taking place. Any suitable triggering event may be used, such as new file(s) being added to the central cluster 506, file(s) being modified on the central cluster 506, a predetermined threshold amount of files being added to and/or modified on the central cluster 506, an explicit request from an administrator, etc.

In order to provide such data filters, a cognitive data filtering mechanism that dynamically adapts cognitive data filters according to their effectiveness against several factors are described herein in various embodiments. These factors include data requirements, policy requirements, and user expectations, among other possible factors.

According to one embodiment, the cognitive data filtering mechanism utilizes a set of predefined keyword(s), value(s), and/or range(s) that are used to define a plurality of cognitive data filters, one or more measures of individual data filter effectiveness as measured against data usage, user expectations, and policy requirements, and a selection module configured to determine and select one or more of the plurality of cognitive data filters that are most likely to effectively return a set of data that fulfills a received query. This effectiveness may be measured at any present time, and over one or more previous periods of time (e.g., one or more moving time windows).

According to one embodiment, the plurality of cognitive data filters may learn to be more effective at preparing data to be returned in response to received queries. This learning process may cause additional cognitive data filters to be created, existing cognitive data filters to be deleted and/or removed, and for existing cognitive data filters to be modified to account for changes to data, user expectations, and/or data structure.

In this embodiment, the plurality of cognitive data filters may utilize one or keywords in order to pre-sort through the data stored to the global data repository to determine which data should be pre-fetched and/or cached for queries received subsequent to the pre-sorting. The data is sorted against the one or more keywords to determine which files and/or objects include the one or more keywords, and then the files and/or objects which include the one or more keywords are placed into a container and labeled in a manner which can locate the container and files and/or objects stored therein in response to a query which requests data that includes the keyword(s). Based on received indication of query interests which may be obtained from users or derived from their query history, containers created in this manner may be pre-fetched and/or cached (e.g., copied over WAN or some other suitable network or connection between the global data repository and a requesting device, or stored in a memory of the global data repository or a requesting device) for use with subsequent and/or future incoming queries that are related to the one or more keywords.

In other embodiments, one or more values may be searched in the data stored to the global data repository, such that any file and/or object which includes the searched value(s) are placed into a container and labeled in a manner which can locate the container and files and/or objects stored therein in response to a query which requests data that includes the value(s). In a further embodiment, data that includes a range of values may be pre-sorted into a container for future use, e.g., all data that includes parameter x having a range from value 1 to value 2 (sort all data into container 1, where the data includes parameter x having a value in the following range: value 1<x<value 2). Of course, the range may be inclusive of the endpoints, exclusive of the endpoints, or a mixture of inclusive and exclusive.

As more and more containers are created in the global data repository to pre-sort data therein, and as more and more queries are received and responded to using the data in the containers, the effectiveness of the pre-sorting may be determined over time and the cognitive data filters may be refined to better pre-sort the data prior to receiving the queries.

In various embodiments, one or more effectiveness metrics may be utilized to calculate the effectiveness of each of the plurality of cognitive data filters individually. In each embodiment, the effectiveness of a single cognitive data filter may be calculated using filter precision, FP(k), which is an indication of how great of a portion of data cached, pre-fetched, and/or copied over (e.g., data that is copied over WAN or some other suitable network or connection between the global data repository and a requesting device) in anticipation of a query (by utilizing one or more filters) or in response to a query that includes at least one keyword, parameter, or range, (notated as "k"), is actually utilized by the query on the requesting device (such as a local cluster). Filter recall, FR(k), indicates a percentage out of all the data stored to the requesting device that is available to be used in queries is copied over due to the value of k for the received query, e.g., data may already be stored to the requesting device to be used in the query, and this may cause some of the copied over data to be disposed of because it is already present on the requesting device. Therefore, this duplicative data should not be counted against the effectiveness of the data filter for any particular set of k.

In accordance with one embodiment, a first effectiveness metric, referred to as a first filter F-score for a single or set of keywords, parameters, or ranges, $FF(k)_1$, may be calculated according to Algorithm 1:

$$FF(k)_1 = \sqrt{FP(k)*FR(k)} \qquad \text{Algorithm 1}$$

In Algorithm 1, the square root of a simple multiplication operation is taken to determine a geometric mean of the product of the filter precision, FP(k), and the filter recall, FR(k), to calculate the first filter F-score, $FF(k)_1$. This effectiveness metric, e.g., the first filter F-score $FF(k)_1$, may then be used to further refine the plurality of cognitive data filters, as described in more detail below. A higher first filter F-score $FF(k)_1$ is indicative of a better performing data filter, as opposed to a lower first filter F-score $FF(k)_1$ which indicates a data filter that is not performing effectively for a particular set of k.

In another embodiment, a second effectiveness metric for a single or set of keywords, parameters, or ranges, $FF(k)_2$, may be calculated according to Algorithm 2:

$$FF(k)_2 = \frac{(2*FP(k)*FR(k))}{(FP(k)+FR(k))} \quad \text{Algorithm 2}$$

In Algorithm 2, multiple multiplication operations (and/or division operations) are performed to determine the product of two times the filter precision, FP(k), and the filter recall, FR(k), multiplied by the reciprocal of the sum of the filter precision, FP(k), and the filter recall, FR(k). The second effectiveness metric, $FF(k)_2$, is normalized according to the sum of the filter precision, FP(k), and the filter recall, FR(k), which better accounts for data that already exists on the requesting device. This second effectiveness metric, $FF(k)_2$, may then be used to further refine the plurality of cognitive data filters, as described in more detail below. A higher second filter F-score $FF(k)_2$ is indicative of a better performing data filter, as opposed to a lower second filter F-score $FF(k)_2$ which indicates a data filter that is not performing effectively for a particular set of k.

In order to initialize either of the effectiveness metrics, e.g., $FF(k)_1$ or $FF(k)_2$, a potential set of k is established, referred to herein as KS (which may include one or more keywords, one or more values, and/or one or more ranges of values). This KS is established based on taxonomy used in the global data repository and/or domain knowledge that an administrator has of the global data repository, along with any available shortcuts. The taxonomy defines how files and/or objects are named, how they are stored to the global data repository, which metadata exists for some or all of the files and/or objects, how the files and/or objects may be searched, sorted, filtered, etc., on the global data repository, etc.

An active set of k, referred to herein as AS is set to be empty, e.g., { }. Thereafter, an effectiveness metric is computed for every keyword, value, and/or range within KS, k, for every time window, w. Various time windows may be used for computation of the effectiveness metric(s), such as 30 seconds, 1 minute, 30 minutes, 1 hour, 6 hours, 12 hours, 1 day, etc., and may be based on a frequency of receiving queries at the global data repository to gain a better understanding of how well the returned data is being utilized.

After computation of one or more effectiveness metrics, the AS is updated to include only a portion, n, of k from KS. The portion that is included in the AS is based on FF, FP, and/or FR. In one embodiment, only a top performing percentage of k are included based on FF. In another embodiment, only a top performing percentage of k are included based on meeting threshold values set for both FP and FR, e.g., >0.7, >0.8, etc.

In response to using top performing percentage of k based on FF, then AS is set as the top n keywords according to their FF rankings. In response to using k based on meeting threshold values set for both FP and FR, then 1) keyword(s), value(s), and/or range(s) are removed from AS that perform below a first threshold for FP; 2) keyword(s), value(s), and/or range(s) are removed from AS that perform below a second threshold for FR; 3) keyword(s), value(s), and/or range(s) are added to AS that perform at or better than the first threshold for FP; and keyword(s), value(s), and/or range(s) are added to AS that perform at or better than the second threshold for FR. The first threshold and second threshold may have different values or the same value, in various approaches.

In one embodiment, the text-based files and/or all files 504 stored on the central cluster 506 may be filtered and grouped according to one or more keywords. The keyword(s) may be automatically created based on input from a number of users interacting with the various local clusters 508 and may represent most commonly queried terms over a predetermined period of time.

When a query is executed on a local cluster, the query or some indication of the query is typically sent to the central cluster 506 to determine which of the files 504 satisfy the query. Any type of query may be utilized, such as a search query, an analytics query which determines something about the underlying data returned by the analytics query (e.g., one or more aspects, characteristics, similarities, and/or differences between data in the query). Conventionally, all of the files 504 are duplicated to the local cluster requesting the query. In another conventional approach, the query may be executed on the central cluster 506, thereby using up valuable resources of the central cluster 506, rather than pushing the workload out to one of the local clusters 508.

Figure 5C:
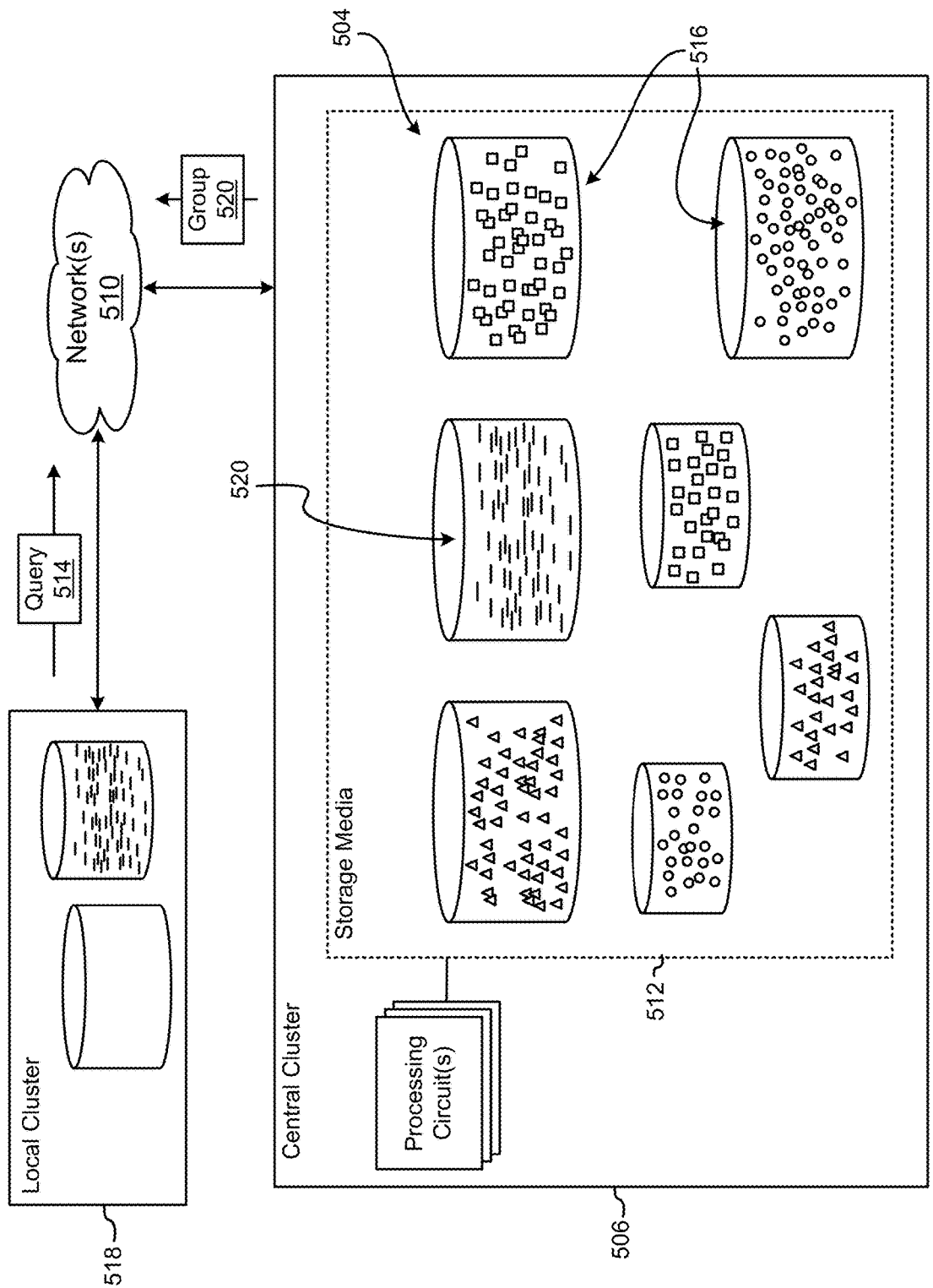

As shown in FIG. 5C, in response to groups 516 pre-existing on the central cluster 506 that are cognitively created to satisfy common queries, relevant files to a particular query 514 may be quickly determined and duplicated on a local cluster 518 from which the query 514 originates, as opposed to duplicating all files 504 to the local cluster 518 from which the query 514 originated. This saves substantial resources over conventional processes, as there is no need to filter results using resources (such as memory space, processor capacity, etc.) of the central cluster 506 or filtering all the files 504 once duplicated on the local cluster 518 to determine which of the files 504 are relevant to the query. This is due, in part, to resources of the local cluster 518 being utilized to only filter a subset of the files 504, e.g., those which are within one or more particular groups 520 on the central cluster 506 which relate to the query, as determined by the central cluster 506 upon receiving the query 514.

After filtering and grouping is performed on at least some of the files 504 of the central cluster 506, the various filters that are used to group the files 504 learn and adapt over time, based on the usefulness of existing groups and the usage patterns of the local clusters 508 for groups on the central cluster 506. This learning will adjust the filters so that they are able to provide groups which include files that are more relevant to received queries, so that less resources of the central cluster 506 are used in response to queries being received in the future. Of course, there is no way to completely anticipate what queries will be received, but smart, learning filters may be able to provide groups that are able to be used to respond to greater than 90% of all received queries, with the remaining queries being responded to with results after filtering the files 504 on the central cluster 506. The learning and adaptation of the filters may cause the various groups 516 to be altered and/or modified in response to the changes to the files 504, such as by adding new group(s), modifying the files that are within one or more groups, removing one or more existing groups, etc.

In another embodiment, the individual files that are grouped together in any single group (such as group 520) may be altered and/or modified over time, in response to the changes, such as by adding one or more new files to a group, removing one or more existing files from a group, modifying which groups a particular file belongs, etc.

Any relevant changes may be accounted for in the grouping of individual files, and the groups 516 themselves, on the central cluster 506, such as changes to raw data underlying the filtered results (e.g., raw data changes may cause a file to no longer be relevant to one group and/or make the file relevant to a group it has not already been added to), a performance-based metric which measures grouping success (e.g., how successful the grouping is in saving resources for queries submitted from the local clusters 508), popularity of files within a particular group (e.g., how often a particular group is duplicated to a local cluster versus a normalized average for all groups), taxonomy changes, etc.

In another embodiment, cache eviction policies may be used to determine which groups 516 to maintain on any particular local cluster (or on all local clusters 508 in a further embodiment) and which groups to delete (or allow to be written over) to free up space for more frequently accessed or more recently requested information. For example, after a group (such as group 520) is duplicated to a local cluster (such as local cluster 518) in response to a query being executed on the local cluster, the group may be maintained within the local cluster for a predetermined period of time as dictated by a cache eviction policy, such as 1 week, 1 day, 12 hours, 3 hours, etc. In response to the group being utilized for another query (whether all of the files in the group or some sub-grouping thereof), the predetermined amount of time may be rest for this particular group so that it will remain on the local cluster for an extended period of time (time after first query until second query+predetermined period of time) in contrast to a group which is only utilized for the first query.

The period of time to maintain a group (such as group 520) on the local cluster (such as local cluster 518), as dictated by one or more cache eviction policies, may be set to apply to a single local cluster in one embodiment, a subset of local clusters in another embodiment, or globally to all local clusters 508, in yet another embodiment. An administrator may set the cache eviction policy as seen fit.

In this way, a group (such as group 520) may be re-utilized one or more times after an initial query is executed, as long as it remains on the local cluster (such as local cluster 518), so that the underlying files of the group do not need to be re-duplicated to the local cluster each time a query dictates access to the files of the group.

Figure 6:
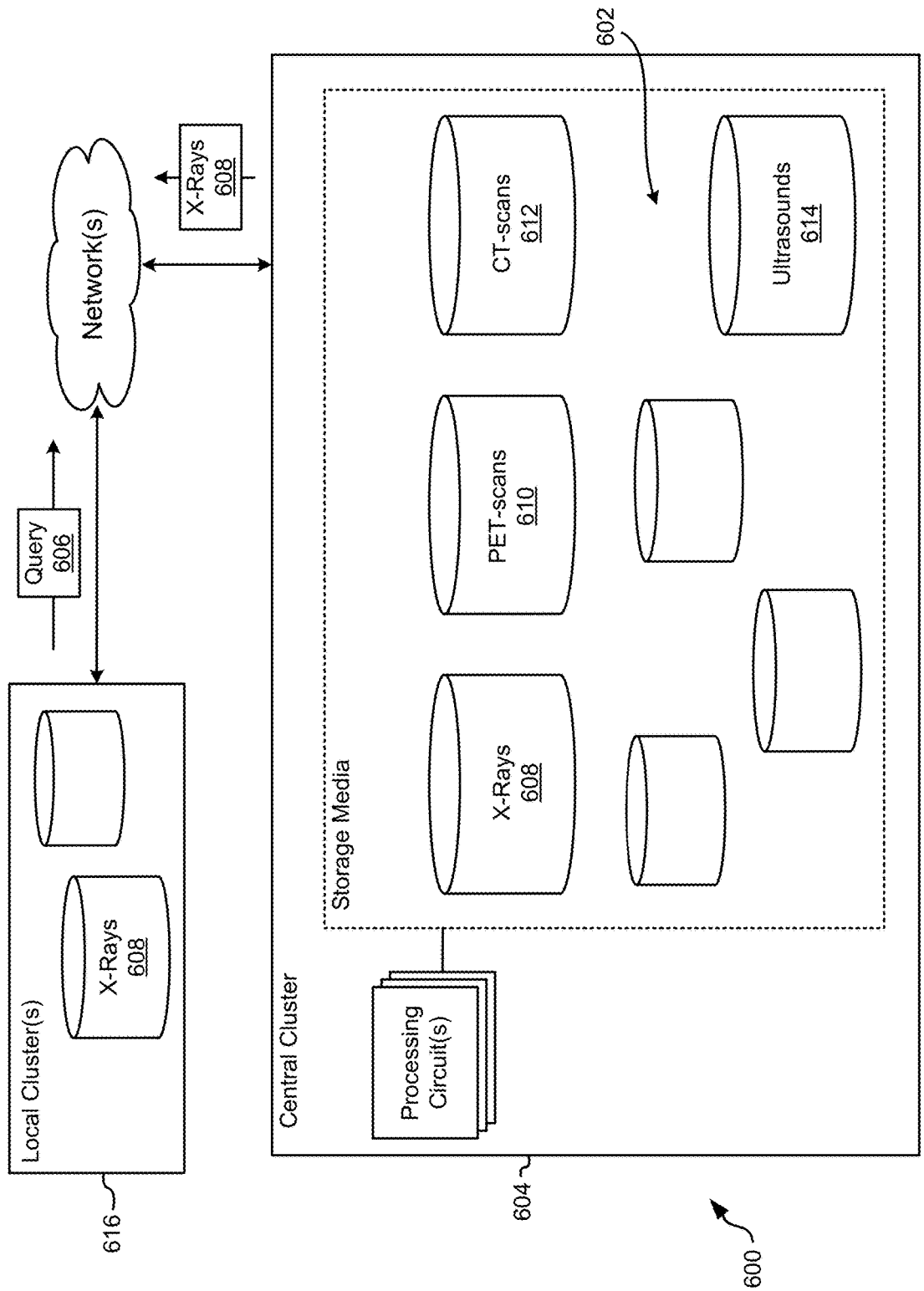
FIG. 6 shows data filtering and grouping for efficient query handling in an exemplary distributed system.

In one example, as shown in FIG. 6 for a distributed system 600 that hosts medical data 602, assume that a query 606 is executed on the data stored to the distributed system 600 for medical data that involves "X-Rays." Also assume that the central cluster 604 has already grouped the medical data 602 stored therein by medical type, e.g., "X-Rays" 608, "PET-scans" 610, "CT-scans" 612, "Ultrasounds" 614, etc. In response to the query for "X-Rays," only the data residing within the group "X-Rays" 608 is sent to the local cluster 616 on which the query originated. Thereafter, the resources of the local cluster 616 are utilized to execute the analytics query on the data residing within the group "X-Rays" 608 instead of the resources of the central cluster 604. Moreover, as time passes since the original query, a cache eviction policy may determine a time in which the data residing within the group "X-Rays" 608 is evicted from the local cluster 616, so that the data may be re-used in additional queries on the local cluster 616.

Figure 7:
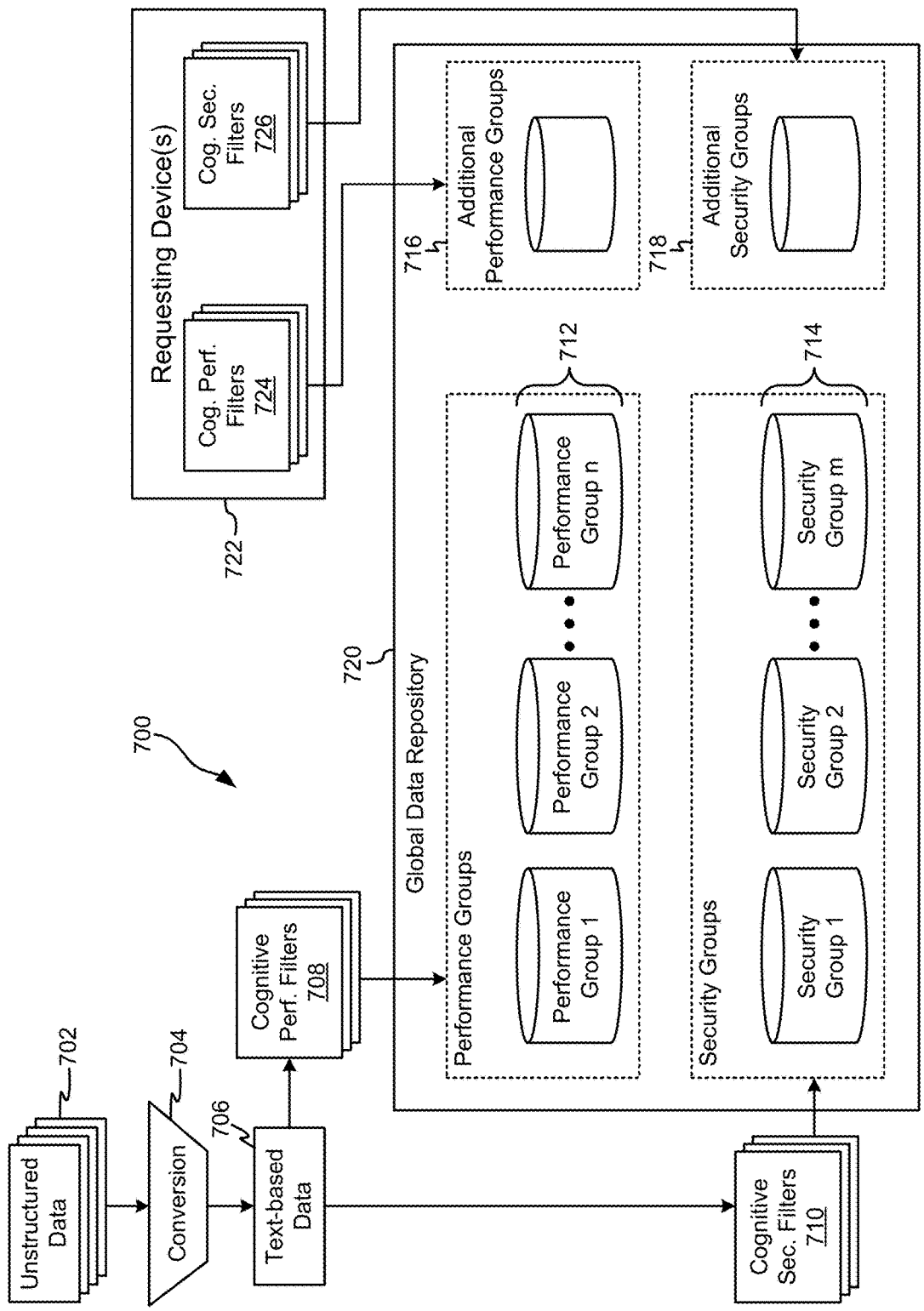
FIG. 7 shows a system that allows for cognitive data filtering, according to one embodiment.

With reference to FIG. 7, a system 700 is shown that enables cognitive filtering of data on a global data repository 720, in accordance with one embodiment. The system 700 includes a set of cognitive performance filters 708 and a set of cognitive security filters 710 that are configured to pre-sort data on the global data repository 720 for any conceivable purpose, such as in anticipation of queries being received from one or more requesting devices 722, to prevent or provide access to select users, etc.

Unstructured data 702 is received by the system 700, with the unstructured data 702 including audio files, video files, image files, etc., that are converted into text-based files 706 using one or more conversion interfaces 704, such as IBM® Watson Conversion APIs in one embodiment. The text-based files 706 also include native text-based files ingested by the system 700 (not shown), in addition to the converted unstructured data 702.

In one embodiment, one or more cognitive performance filters from the set of cognitive performance filters 708 are applied to the text-based files 706 to pre-sort the data into a plurality of performance containers 712 on the global data repository 720. The performance containers 712 are created to increase the performance of the system 700 in responding to received queries (e.g., responding faster to a received query, providing more useful data to a received query, utilizing less resources to reply to a query, etc.). The plurality of performance containers 712 may improve the performance of the system 700 by allowing for more efficient tiering of data among a plurality of tiers available in the global data repository 720 for storing data therein, by improved caching of data to one or more requesting devices 722, etc.

In addition, new cognitive performance filters 708 may be created, existing cognitive performance filters 708 may be deleted or removed, and existing cognitive performance filters 708 may be modified to increase their effectiveness over time based on one or more effectiveness metrics. These changes may result in changes (addition, deletion, modification) to the plurality of performance containers 712 in various approaches.

In response to a requesting device 722 receiving data from the global data repository 720, additional cognitive performance filter(s) 724 may be provided to the system 700 that are configured for actual data queries executed on the requesting device(s) 722, which allows for additional performance containers 716 to be created in the global data repository 720, which may be made available only to the requesting device 722 which provided the additional cognitive performance filter(s) 724, or to some or all users of the global data repository 720, in several approaches.

In another embodiment, one or more cognitive security filters from the set of cognitive security filters 710 are applied to the text-based files 706 to pre-sort the data into a plurality of security containers 714 on the global data repository 720. The security containers 714 are created to provide improved access control to data on the global data repository 720, such that the performance of the system 700 is improved in denying or allowing access to subsets of files and/or objects on the global data repository 720. The plurality of security containers 714 may improve the performance of the system 700 by allowing for more efficient monitoring of access control for users to data stored to the global data repository 720 by pre-sorting data accessible to select groups of users, such that any access attempted by such a user is replied to with only the data available in the security container 714 assigned to the user.

In addition, new cognitive security filters 710 may be created, existing cognitive security filters 710 may be deleted or removed, and existing cognitive security filters 710 may be modified to increase their effectiveness over time based on one or more effectiveness metrics. These changes may result in changes (addition, deletion, modification) to the plurality of security containers 714 in various approaches.

In response to a requesting device 722 receiving data from the global data repository 720, additional cognitive security filter(s) 726 may be provided to the system 700 that are configured for actual data queries executed on the requesting device(s) 722, which allows for additional security containers 718 to be created in the global data repository 720, which may be made available only to the requesting device 722 which provided the additional cognitive security filter(s) 726, or to some or all users of the global data repository 720, in several approaches.

Figure 8:
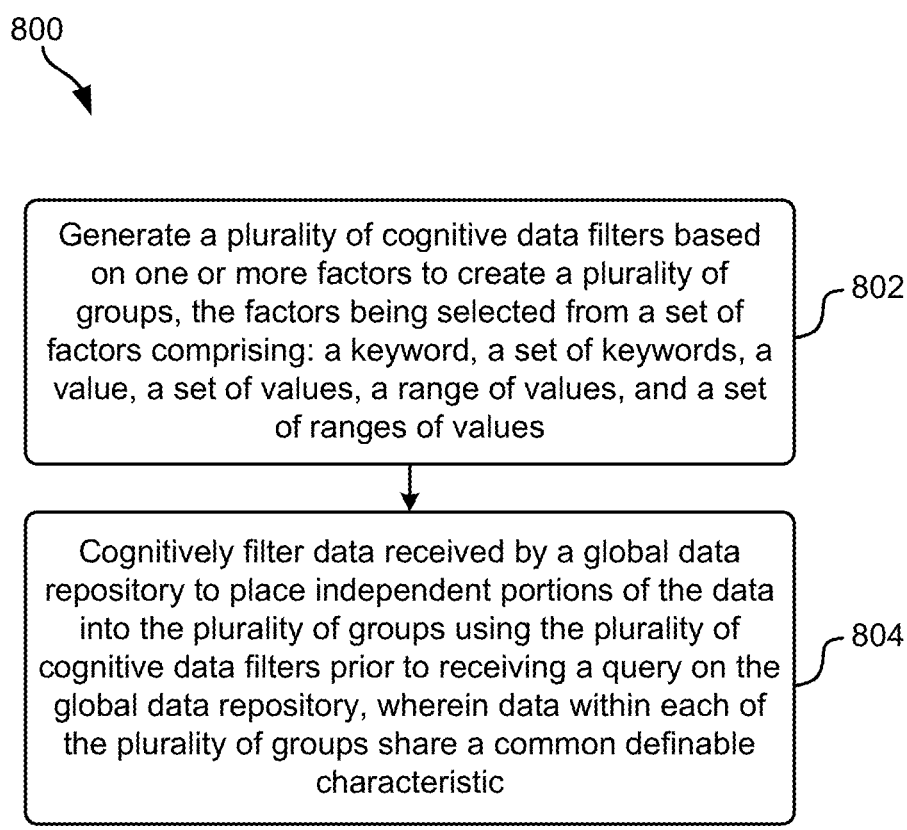
FIG. 8 shows a flowchart of a method, according to one embodiment.

Now referring to FIG. 8, a method 800 is shown according to one embodiment. The method 800 may be performed in accordance with the present invention in any of the environments depicted in FIGS. 1-7, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by a microprocessor, a server, a cluster of computing devices (e.g., a local cluster), a processing circuit having one or more processors therein, or some other device comprising one or more processors. The processing circuit, e.g., processor(s), chip(s), and/or module(s) implemented in hardware and/or software, and preferably having at least one hardware component, may be utilized in any device to perform one or more steps of the method 800. Illustrative processors include, but are not limited to, a MPU, a CPU, an ASIC, a FPGA, etc., combinations thereof, or any other suitable computing device known in the art.

As shown in FIG. 8, method 800 may start with operation 802, where a plurality of cognitive data filters are generated based on one or more factors to create a plurality of groups. The factors on which the plurality of cognitive data filters are based are selected from a set of factors that include, but are not limited to, a keyword, a set of keywords, a value, a set of values, a range of values, and a set of ranges of values.

These plurality of cognitive data filters may be used to filter and sort data stored to the global data repository into the plurality of groups, with data being able to be placed within more than one group, and each group being able to be independently managed (e.g., modified, deleted, added, etc.).

In operation 804, data received by a global data repository is cognitively filtered to place independent portions of the data into the plurality of groups using the plurality of cognitive data filters. This filtering takes place prior to receiving a query on the global data repository. Moreover, data within each of the plurality of groups share a common definable characteristic, which is how each of the plurality of cognitive data filters sort and filter the data into the various groups. Each group may be based on at least one different definable characteristic of the data sorted into the particular group as compared to the characteristic(s) of data used to create other groups.

In a further embodiment, method 800 may include receiving the data at the global data repository from one or more sources, the data including text and unstructured data. Also, storing the data to the global data repository and converting the unstructured data into pure text-based data and/or text-annotated data (collectively referred to as "text-based data"). In addition, method 800 may include storing the text-based data on the global data repository, the plurality of cognitive data filters being applied to the text-based data after being converted from the unstructured data (or on text-based data as received), and receiving, at the global data repository, an indication of the query. The indication of the query may be the query itself, a set of queries previously received and/or anticipated to be received in the future, and/or interests expressed by one or more users that may form the basis of a future query, and may be used to pre-fetch data for such a future query. Moreover, method 800 may include determining and pre-fetching (e.g., copying over) at least one group that corresponds with the query to a storage area for use in accumulating pre-fetched data. Thereafter, method 800 may include responding to the query by duplicating data within the at least one group to a requesting device that provided the query. Any of these steps may be performed alone or in addition to any other steps described for method 800 in various approaches.

In another embodiment, method 800 may further include receiving an indication of usage of data within the at least one group provided to the requesting device with respect to the query. This indication may be used to determine an effectiveness of the plurality of cognitive data filters with respect to any particular query (e.g., set of k as specified by the query).

Moreover, in one approach, method 800 may include adapting the plurality of cognitive data filters over time to improve an effectiveness of the plurality of cognitive data filters as measured against usage of data within one or more groups provided to a requesting device in response to receiving an indication of a query from the requesting device. This process is also referred to herein as the cognitive data filters learning based on past performance and user expectations. The effectiveness of the plurality of cognitive data filters may be based on one or more of a portion of the data within the one or more groups provided to the requesting device that is actually utilized by the query, and a percentage out of all data stored to the requesting device that is available to be used in the query that is provided within the one or more groups. In one embodiment, both measurements may be combined together to calculate the effectiveness of the plurality of cognitive data filters, referred to herein as a filter F-score According to one embodiment, the effectiveness of the plurality of cognitive data filters, $FF(k)_1$, may be calculated according to Algorithm 1, as previously defined.

According to an alternate embodiment, the effectiveness of the plurality of cognitive data filters, $FF(k)_2$, may be calculated according to Algorithm 2, as previously defined.

In a further embodiment, method 800 may include updating the plurality of groups to account for changes to data stored to the global data repository. This updating may occur periodically based on a predetermined schedule, continuously as a background operation, or in response to a triggering event. Also, this updating the plurality of groups includes an action, such as removing one or more groups, adding one or more groups, adding additional data to a particular group, removing existing data from the particular group, etc.

Moreover, the triggering event may be selected from a set that includes, but is not limited to, deletion of existing data from the global data repository, addition of additional data to the global data repository, addition of a new type of data to the global data repository, and update of a text conversion process of the global data repository.

Method 800 may be implemented in a system and/or a computer program product. For example, a system may include a processing circuit and logic integrated with the processing circuit, executable by the processing circuit, or integrated with and executable by the processing circuit. By integrated with, what is meant is that the processing circuit is a hardware processor that has hardcoded logic included therewith, such as an ASIC, a FPGA, etc. By executable by, what is meant is that the processor is configured to execute software logic to achieve functionality dictated by the software logic, with the processor possibly being a MPU, a CPU, a microprocessor, etc. The logic is configured to cause the processing circuit to perform method 800.

In another example, a computer program product may include a computer readable storage medium having program instructions embodied therewith. The computer readable storage medium may be any suitable storage device known in the art that is configured to store and allow computer access to information stored therein. The embodied program instructions are executable by a processing circuit to cause the processing circuit to perform method 800.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), etc.

It will be clear that the various features of the foregoing systems and/or methodologies may be combined in any way, creating a plurality of combinations from the descriptions presented above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
generating a plurality of cognitive data filters based on one or more factors to create a plurality of groups, wherein at least one of the factors is a value, wherein the value is custom defined based on a particular application and specific queries associated therewith, wherein generating the plurality of cognitive data filters is based at least on grouping according to popularity of information in individual files as measured by a central cluster and how often any particular file is duplicated onto a local cluster;
receiving data at a global data repository from one or more sources, the data including text and video data;
converting the video data into text-based data;
cognitively filtering the data using the text and the text-based data to place independent portions of the data into the plurality of groups using the plurality of cognitive data filters prior to receiving a query on the global data repository, wherein data within each of the plurality of groups share a common definable characteristic, wherein each of the plurality of groups comprises at least one sub-group, wherein sub-groups within each of the plurality of groups are organized in a tree structure;
modifying the plurality of cognitive data filters over time based on effectiveness metrics; and
modifying the plurality of groups over time using the modified plurality of cognitive data filters.

2. The method as recited in claim 1, comprising:
storing the data to the global data repository;
receiving, at the global data repository, an indication of the query;
determining and pre-fetching at least one group that corresponds with the query; and
responding to the query by duplicating data within the at least one group to a requesting device that provided the indication of the query.

3. The method as recited in claim 2, comprising:
receiving an indication of usage of data within the at least one group provided to the requesting device with respect to the query.

4. The method as recited in claim 1,
wherein modifying the plurality of cognitive data filters over time improves an effectiveness of the plurality of cognitive data filters as measured against usage of data within one or more groups provided to a requesting device in response to receiving an indication of a query from the requesting device,
wherein the effectiveness of the plurality of cognitive data filters is based on each of: a portion of the data within the one or more groups provided to the requesting device that is actually utilized by the query, and a percentage out of all data stored to the requesting device that is available to be used in the query that is provided within the one or more groups.

5. The method as recited in claim 4, wherein the effectiveness metrics of the plurality of cognitive data filters, $FF(k)_1$, are calculated according to a first algorithm, $FF(k)_1 = \sqrt{FP(k)*FR(k)}$, where $FP(k)$ indicates the portion of the data within the one or more groups provided to the requesting device that is actually utilized by the query and has a first value in a range that includes zero, one, and all values therebetween, and where $FR(k)$ indicates the percentage of all the data stored to the requesting device that is available to be used in the query that is provided within the one or more groups and has a second value in the range.

6. The method as recited in claim 4, wherein the effectiveness metrics of the plurality of cognitive data filters, $FF(k)_2$, are calculated according to a second algorithm, $FF(k)_2 = (2*FP(k)*FR(k))/(FP(k)+FR(k))$, where $FP(k)$ indicates the portion of the data within the one or more groups provided to the requesting device that is actually utilized by the query and has a first value in a range that includes zero, one, and all values therebetween, and where $FR(k)$ indicates the percentage of all the data stored to the requesting device that is available to be used in the query that is provided within the one or more groups and has a second value in the range.

7. The method as recited in claim 1, comprising:
modifying the plurality of groups to account for changes to data stored to the global data repository, wherein modifying the plurality of groups occurs periodically based on a predetermined schedule, continuously as a background operation, or in response to a triggering event, and wherein modifying the plurality of groups includes an action selected from a set of actions comprising: removing one or more groups, adding one or more groups, and removing existing data from a particular group.

8. The method as recited in claim 7, wherein the triggering event is selected from a set comprising: deletion of existing data from the global data repository, addition of a new type of data to the global data repository, and update of a text conversion process of the global data repository.

9. A computer program product, the computer program product comprising a computer readable storage medium having program instructions embodied therewith, wherein the computer readable storage medium is not a transitory signal per se, the embodied program instructions being executable by a processing circuit to cause the processing circuit to:
generate, by the processing circuit, a plurality of cognitive data filters based on one or more factors to create a plurality of groups, wherein at least one of the factors is a value, wherein the value is custom defined based on a particular application and specific queries associated therewith, wherein generating the plurality of cognitive data filters is based at least on grouping according to popularity of information in individual files as measured by a central cluster and how often any particular file is duplicated onto a local cluster;
cognitively filter, by the processing circuit, data received by a global data repository to place independent portions of the data into the plurality of groups using the plurality of cognitive data filters prior to receiving a query on the global data repository, wherein data within each of the plurality of groups share a common definable characteristic, wherein each of the plurality of groups comprises at least one sub-group, wherein sub-groups within each of the plurality of groups are organized in a tree structure;
modify, by the processing circuit, the plurality of cognitive data filters over time based on effectiveness metrics; and
modify, by the processing circuit, the plurality of groups over time using the modified plurality of cognitive data filters,
wherein modifying the plurality of groups is based at least in part on how often the data is duplicated to the local cluster,
wherein modifying the plurality of groups includes modifying which group the independent portions of data belong to and/or modifying the plurality of groups themselves.

10. The computer program product as recited in claim 9, wherein the embodied program instructions are executable by the processing circuit to cause the processing circuit to:
receive, by the processing circuit, the data at the global data repository from one or more sources, the data including text and unstructured data;
store, by the processing circuit, the data to the global data repository;
convert, by the processing circuit, the unstructured data into text-based data;
store, by the processing circuit, the text-based data on the global data repository, wherein the plurality of cognitive data filters are applied to the text-based data after being converted from the unstructured data;
receive, by the processing circuit at the global data repository, an indication of the query;
determine and pre-fetch, by the processing circuit, at least one group that corresponds with the query; and
respond, by the processing circuit, to the query by duplicating data within the at least one group to a requesting device that provided the indication of the query.

11. The computer program product as recited in claim 10, wherein the embodied program instructions are executable by the processing circuit to cause the processing circuit to:
receive, by the processing circuit, an indication of usage of data within the at least one group provided to the requesting device with respect to the query.

12. The computer program product as recited in claim 9, wherein modifying the plurality of cognitive data filters over time improves an effectiveness of the plurality of cognitive data filters as measured against usage of data within one or more groups provided to a requesting device in response to receiving an indication of a query from the requesting device,
wherein the effectiveness of the plurality of cognitive data filters is based on each of: a portion of the data within the one or more groups provided to the requesting device that is actually utilized by the query, and a percentage out of all data stored to the requesting device that is available to be used in the query that is provided within the one or more groups.

13. The computer program product as recited in claim 12, wherein the effectiveness metrics of the plurality of cognitive data filters, $FF(k)_1$, are calculated according to a first algorithm, $FF(k)_1=\sqrt{FP(k)*FR(k)}$, where $FP(k)$ indicates the portion of the data within the one or more groups provided to the requesting device that is actually utilized by the query and has a first value in a range that includes zero, one, and all values therebetween, and where $FR(k)$ indicates the percentage of all the data stored to the requesting device that is available to be used in the query that is provided within the one or more groups and has a second value in the range.

14. The computer program product as recited in claim 12, wherein the effectiveness metrics of the plurality of cognitive data filters, $FF(k)_2$, are calculated according to a second algorithm, $FF(k)_2=(2*FP(k)*FR(k))/(FP(k)+FR(k))$, where $FP(k)$ indicates the portion of the data within the one or more groups provided to the requesting device that is actually utilized by the query and has a first value in a range that includes zero, one, and all values therebetween, and where $FR(k)$ indicates the percentage of all the data stored to the requesting device that is available to be used in the query that is provided within the one or more groups and has a second value in the range.

15. The computer program product as recited in claim 9, wherein the embodied program instructions are executable by the processing circuit to cause the processing circuit to:
modify, by the processing circuit, the plurality of groups to account for changes to data stored to the global data repository periodically based on a predetermined schedule, continuously as a background operation, or in response to a triggering event, wherein modifying the plurality of groups includes an action selected from a set of actions comprising: removing one or more groups, adding one or more groups, and removing existing data from a particular group.

16. The computer program product as recited in claim 15, wherein the triggering event is selected from a set comprising: deletion of existing data from the global data repository, addition of a new type of data to the global data repository, and update of a text conversion process of the global data repository.

17. A system, comprising:
a processing circuit;
a memory; and
logic stored to the memory, that when executed by the processing circuit causes the processing circuit to:
generate a plurality of cognitive data filters based on one or more factors to create a plurality of groups, wherein at least one of the factors is a value, wherein the value is custom defined based on a particular application and specific queries associated therewith, wherein generating the plurality of cognitive data filters is based at least on grouping according to popularity of information in individual files as measured by a central cluster and how often any particular file is duplicated onto a local cluster;
receive data at a global data repository from one or more sources, the data including text and video data;
convert the video data into text-based data;
cognitively filter the data using the text and the text-based data to place independent portions of the data into the plurality of groups using the plurality of cognitive data filters prior to receiving a query on the global data repository, wherein data within each of the plurality of groups share a common definable characteristic, wherein each of the plurality of groups comprises at least one sub-group, wherein sub-groups within each of the plurality of groups are organized in a tree structure;
modify the plurality of cognitive data filters over time based on effectiveness metrics; and
modify the plurality of groups over time using the modified plurality of cognitive data filters.

18. The system as recited in claim 17, wherein the logic causes the processing circuit to:
store the data to the global data repository;
receive, at the global data repository, an indication of the query;
determine and pre-fetch at least one group that corresponds with the query; and
respond to the query by duplicating data within the at least one group to a requesting device that provided the indication of the query.

19. The system as recited in claim 18, wherein the logic causes the processing circuit to:
receive an indication of usage of data within the at least one group provided to the requesting device with respect to the query.

20. The system as recited in claim 17, wherein modifying the plurality of cognitive data filters over time improves an effectiveness of the plurality of cognitive data filters as measured against usage of data within one or more groups provided to a requesting device in response to receiving an indication of a query from the requesting device,
wherein the effectiveness of the plurality of cognitive data filters is based on each of: a portion of the data within the one or more groups provided to the requesting device that is actually utilized by the query, and a percentage out of all data stored to the requesting device that is available to be used in the query that is provided within the one or more groups.

21. The system as recited in claim 20, wherein the effectiveness metrics of the plurality of cognitive data filters, $FF(k)_1$, are calculated according to a first algorithm, $FF(k)_1 = \sqrt{FP(k)*FR(k)}$, where $FP(k)$ indicates the portion of the data within the one or more groups provided to the requesting device that is actually utilized by the query and has a first value in a range that includes zero, one, and all values therebetween, and where $FR(k)$ indicates the percentage of all the data stored to the requesting device that is available to be used in the query that is provided within the one or more groups and has a second value in the range.

22. The system as recited in claim 20, wherein the effectiveness metrics of the plurality of cognitive data filters, $FF(k)_2$, are calculated according to a second algorithm, $FF(k)_2 = (2*FP(k)*FR(k))/(FP(k)+FR(k))$, where $FP(k)$ indicates the portion of the data within the one or more groups provided to the requesting device that is actually utilized by the query and has a first value in a range that includes zero, one, and all values therebetween, and where $FR(k)$ indicates the percentage of all the data stored to the requesting device that is available to be used in the query that is provided within the one or more groups and has a second value in the range.

23. The system as recited in claim 17, wherein the logic causes the processing circuit to:
modify the plurality of groups to account for changes to data stored to the global data repository, wherein modifying the plurality of groups occurs periodically based on a predetermined schedule, continuously as a background operation, or in response to a triggering event, and wherein modifying the plurality of groups includes an action selected from a set of actions comprising: removing one or more groups, adding one or more groups and removing existing data from a particular group.

24. The system as recited in claim 23, wherein the triggering event is selected from a set comprising: deletion of existing data from the global data repository, addition of a new type of data to the global data repository, and update of a text conversion process of the global data repository.

25. A method, comprising:
receiving data at a global data repository from one or more sources, the data including text and unstructured data comprising video data;
storing the data to the global data repository;
converting the unstructured data, including the video data, into text-based data;
storing the text-based data on the global data repository;
generating a plurality of cognitive data filters based on one or more factors to create a plurality of groups, wherein at least one of the factors is a value, wherein the value is custom defined based on a particular application and specific queries associated therewith, wherein generating the plurality of cognitive data filters is based at least on grouping according to popularity of information in individual files as measured by a central cluster and how often any particular file is duplicated onto a local cluster;
cognitively filtering the data using the text and the text-based data to place independent portions of the data into the plurality of groups using the plurality of cognitive data filters prior to receiving a query on the global data repository, wherein data within each of the plurality of groups share a common definable characteristic, and wherein the plurality of cognitive data filters are applied to the text-based data after being converted from the unstructured data, wherein each of the plurality of groups comprises at least one sub-group, wherein sub-groups within each of the plurality of groups are organized in a tree structure;

adapting the plurality of cognitive data filters over time based on effectiveness metrics;
adapting the plurality of groups over time using the adapted plurality of cognitive data filters,
wherein adapting the plurality of groups is based at least in part on how often the data is duplicated to the local cluster,
wherein adapting the plurality of groups includes adapting which group independent portions of data belong to and/or adapting the plurality of groups themselves;
receiving an indication of the query;
determining and pre-fetching at least one group from the plurality of groups that corresponds with the query;
responding to the query by duplicating data within the at least one group to a requesting device that provided the indication of the query; and
receiving an indication of usage of data within the at least one group provided to the requesting device with respect to the query,
wherein adapting the plurality of cognitive data filters over time improves an effectiveness of the plurality of cognitive data filters as measured against the usage of the data within the at least one group provided to the requesting device in response to receiving an indication of a query from the requesting device,
wherein the effectiveness of the plurality of cognitive data filters is based on each of: a portion of the data within the at least one group provided to the requesting device that is actually utilized by the query, and a percentage out of all data stored to the requesting device that is available to be used in the query that is provided within the at least one group,
wherein the effectiveness of the plurality of cognitive data filters, $FF(k)_1$, is calculated according to a first algorithm, $FF(k)_1 = \sqrt{FP(k) * FR(k)}$, where $FP(k)$ indicates the portion of the data within the one or more groups provided to the requesting device that is actually utilized by the query and has a first value in a range that includes zero, one, and all values therebetween, and where $FR(k)$ indicates the percentage of all the data stored to the requesting device that is available to be used in the query that is provided within the one or more groups and has a second value in the range.

* * * * *